Nov. 1, 1927.
E. E. BRASS
1,647,338
PUMPKIN WILTING MACHINE
Filed May 2, 1925
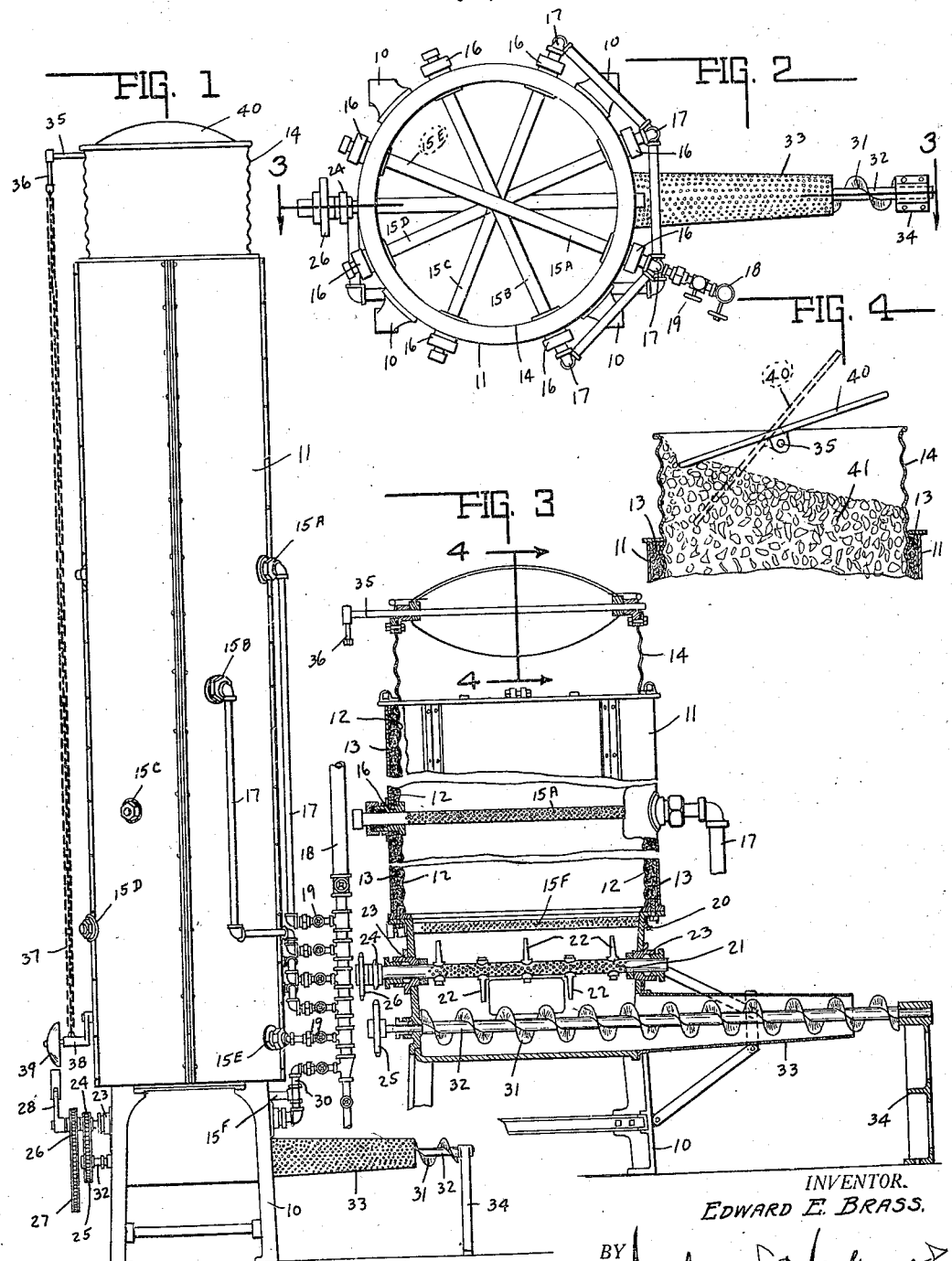
INVENTOR.
EDWARD E. BRASS.
BY Lockwood & Lockwood,
ATTORNEYS.

Patented Nov. 1, 1927.

1,647,338

UNITED STATES PATENT OFFICE.

EDWARD E. BRASS, OF PETERSBURG, ILLINOIS, ASSIGNOR TO INDIANA CANNING MACHINERY COMPANY, OF INDIANAPOLIS, INDIANA, A CORPORATION.

PUMPKIN-WILTING MACHINE.

Application filed May 2, 1925. Serial No. 27,617.

This invention pertains to the cooking of pumpkins preparatory to the pulping process.

The invention relates particularly to a process of continuous cooking of previously prepared chopped or cut up pumpkin, whereby such pumpkin may be fed through a suitable machine and delivered therefrom cooked to the proper degree and ready for pulping. The invention further relates to the machine and mechanism employed in carrying out the process, as will be hereinafter more fully set forth.

The full nature of the invention will be understood from the accompanying drawings and the following description and claims:

In the drawings, Figure 1 is a side elevation of the cooking tank. Fig. 2 is a top plan view with the top plate removed. Fig. 3 is a section taken on the line 3—3 of Fig. 2, Fig. 4 is a section taken on the line 4—4 of Fig. 3.

In the drawings, there is shown a supporting frame comprising the legs 10 upon which is mounted a relatively tall cooking tank 11. As shown in Fig. 3, said tank is formed of an outer boiler plate structure with an inner lining of corrugated tubing 12. Between the inner lining and the outer shell there is provided an insulating material 13 for retaining heat within the tank. The inner lining extends upwardly beyond the top of the tank, as shown at 14.

Positioned within the tank there is provided a plurality of steam discharge pipes $15^a$, $15^b$, $15^c$, $15^d$, $15^e$ and $15^f$, as shown in Fig. 2. It will be noted that the pipe $15^e$ is positioned at the bottom and in line with the pipe $15^a$. Said pipes are provided with a plurality of perforations through which the steam is discharged within the tank. They extend diametrically across the same and are spaced apart, one above the other, as best illustrated in Fig. 1. Furthermore, they extend at an angle to each other, or in different vertical planes through the tank. They are supported in the side walls of the tank by means of the packing boxes 16 and are connected at one end with their respective steam supply pipes 17. Said respective steam supply pipes 17 are connected with the main steam supply pipe 18 and are controlled by their respective valves 19.

Mounted immediately below the tank there is a receiving trough 20 in which the steam discharge pipe $15^f$ is mounted and a rotating and diametrically positioned perforated condensed steam and juice discharge pipe 21. Said pipe 21 is open at one end, and is provided with the staggered projections or agitating paddles 22. The rotating discharge pipe 21 is rotatably mounted in the trough 20 in suitable bearings 23 provided with the necessary packing. On one end of said pipe there is provided a sprocket 24 in position to drive the sprocket 25 through a suitable chain and associated with the sprocket 24 on said shaft there is a second sprocket 26 adapted to be driven by a chain 27 from a suitable source of power. On the extreme end of said pipe adjacent said sprockets there is a bell clapper 28 adapted to rotate therewith. Immediately below said pipe and contained within the trough there is a spiral feed screw 31 including a shaft 32 which extends through the trough and upon which the sprocket 25 is mounted for causing its rotation. A discharge spout 33 extends outwardly from the trough and is tapered to a reduced opening at the outer extremity thereof, which opening is just large enough to permit the screw to pass therethrough. Said spout is perforated for permitting the water or liquid to pass therethrough, as will be hereinafter described. The outer end of the screw shaft 32 is mounted in a suitable bearing on a support 34 and immediately below the restricted opening of the spout 33 there may be arranged a suitable conveyor for receiving and conveying the discharged material therefrom.

Mounted in the top of the tank or rather the inner lining 14 there is a diametrically positioned shaft 35 having a crank arm 36 mounted thereon, which arm is connected by a chain 37 to a crank 38 positioned near the bottom of the tank. Said crank 38 has a bell gong 39 capable of being lowered to a position for engagement by the clapper 28 as the same is being revolved, or capable of being withdrawn out of the path of the rotating clapper. Mounted on the shaft 35 so as to move therewith, there is a plate or tongue 40 which will be maintained in substantially the position shown in dotted lines in Fig. 5, while the material 41 is being delivered over the edge of the tank at the top thereof. As the material piles up in the tank, it will gradually raise the plate to a position substantially as shown in full lines, which will actuate the shaft 35 to lower the gong 39 in position to be struck by the clapper 28 and give the signal that the tank has been filled. However, with respect to this arrangement, a suitable float or similar means may be employed for warning the operator upon the complete filling of the tank.

In operation the pumpkin which has been previously washed, cut into small pieces and seeded, will be conveyed by suitable buckets or other means to the top of the tank and discharged over the edge thereof, as shown in Fig. 4. Assuming that the tank is empty at the beginning of operation, the power operating the driving chain 27 is cut off so that the pumpkin will not be discharged. It will fill up the trough 20, upon which steam will be turned into the pipe $15^f$. As the level of the pumpkin reaches the steam pipe $15^e$, the steam in that pipe will thereupon be turned on. The steam in the respective pipes $15^{a-d}$ will thereafter be turned on as the level of the pumpkin rises to the respective steam discharge pipes. After the tank has been partially filled, the pumpkin in the trough having been sufficiently steamed through the steam pipes $15^{a-f}$, power will be applied to the chain 27 and the discharge mechanism actuated so as to discharge the pumpkin from the bottom of the tank. Thereafter the discharge of the cooked pumpkin will substantially equal the intake thereof so that the operation will be continuous. Furthermore, the discharge may be regulated as well as the feeding of the pumpkin to acquire the desired amount of cooking. This will prevent the pumpkin from being over cooked and thereby taking on a darker color rather than the normal pumpkin color. The staggered arrangement of the diametrically disposed steam discharge pipes $15^{a-e}$ will be such as to act as baffle plates for the pumpkin as it passes downwardly so that all parts thereof will be thoroughly steamed.

In the trough, the rotation of the fluid discharge pipe 21 with the projections or paddles 22 thereon will turn the pumpkin and eliminate any air pockets formed therein, as well as causing the pumpkin to be fed to the tapered and perforated spout 33 which has its outer end reduced. As the pumpkin is discharged therefrom, it will be squeezed against the perforated spout so that the water contained therein due to the steam will be substantially eliminated therefrom.

Particular mention should be made of the corrugated inner lining or shell 14, which is of very great importance to this invention. The peripheral recesses and ribs extending in parallel horizontal planes forming the corrugated surface of the inner lining 14 permits of circulation of live steam about the circumference of the sleeve or shell and about the outer portion of the pumpkin contained therein, and thus wilting the pumpkin about the outer portions thereof. Furthermore, the corrugated surface permitting such circulation of the steam, prevents the pumpkin from clinging to the sides and becoming cooked thereon, while at the same time there are no recesses, ribs or other unevenness of surface, such as will resist the downward movement of the mass or catch and retain portions thereof.

The invention claimed is:

1. In a machine for cooking pumpkin or the like, a relatively tall vertically positioned tank adapted to receive the pumpkin at the top thereof, a plurality of steam sprays mounted in said tank for discharging steam into the pumpkin contained therein, a receiving trough mounted below said tank, and means provided in said trough for eliminating the water contained in the pumpkin and conveying the pumpkin from the tank.

2. In a machine for cooking pumpkin or the like, a relatively tall vertically positioned tank adapted to receive the pumpkin at the top thereof, a plurality of steam sprays mounted in said tank for discharging steam into the pumpkin contained therein, a receiving trough mounted below said tank, an outwardly tapered perforated spout communicating with said trough and having a reduced opening at the end thereof, and a screw conveyor mounted in said trough and extending through said spout for conveying the cooked pumpin therethrough and squeezing the water therefrom.

3. In a machine for cooking pumpkin or the like, a relatively tall vertically positioned tank adapted to receive the pumpkin at the top thereof, a plurality of steam sprays mounted in said tank for discharging steam into the pumpkin contained therein, means for agitating and simultaneously discharging water and juice from the pumpkin, and means for discharging the pumpkin and eliminating water therefrom.

4. In a machine for cooking pumpkin or the like, a relatively tall vertically positioned tank adapted to receive the pumpkin at the top thereof, a plurality of steam sprays mounted in said tank for discharging steam into the pumpkin contained therein, a rotatably mounted perforated discharge pipe positioned near the bottom of said tank, a plurality of outwardly extending projections on said pipe for agitating the pumpkin simultaneously with the discharge of fluid therefrom, and rotary means for squeezing water from the pumpkin and conveying the same from said tank.

5. In a machine for cooking pumpkins or the like, a relatively tall vertically positioned tank adapted to receive the pumpkin at the top thereof, a plurality of steam sprays mounted in said tank for discharging steam into the pumpkin contained therein, means positioned at the bottom of said tank for discharging the pumpkin therefrom, and a signalling mechanism mounted in conjunction with said tank and controlled by the top level of the pumpkin contained therein adapted to be actuated upon said level approaching the top of said tank.

6. In a machine for cooking pumpkin or the like, a relatively tall tubular vertically mounted tank, an inner sleeve positioned in said tank and insulated from the outer wall thereof, a plurality of perforated steam discharge pipes mounted in said tank between the top and bottom thereof, said pipes being positioned diametrically and spaced one above the other in different vertical planes, means for conducting steam to said pipes, a receiving trough mounted below said tank, a rotary fluid discharge pipe rotatably mounted in said trough and having a plurality of projections thereon for agitating the pumpkin, a screw shaft for receiving and delivering the pumpkin from said trough, means for rotating said rotary discharge pipe and screw shaft, and a perforated spout tapering outwardly through which said screw shaft operates and adapted to cause the pumpkin to be squeezed thereagainst by said screw shaft upon its discharge for removing water contained therein.

In witness whereof, I have hereunto affixed my signature.

EDWARD E. BRASS.